US008099341B2

(12) United States Patent
Varghese (10) Patent No.: US 8,099,341 B2
(45) Date of Patent: Jan. 17, 2012

(54) SYSTEM AND METHOD FOR RECREATING TAX DOCUMENTS

(75) Inventor: Dennis Varghese, Astoria, NY (US)

(73) Assignee: OREM Financial Services Inc., Cheyenne, WY (US)

( * ) Notice: Subject to any disclaimer, the term of this patent is extended or adjusted under 35 U.S.C. 154(b) by 92 days.

(21) Appl. No.: 11/509,897

(22) Filed: Aug. 24, 2006

(65) Prior Publication Data

US 2006/0282354 A1 Dec. 14, 2006

Related U.S. Application Data (60) Provisional application No. 60/766,609, filed on Jan. 31, 2006.

(51) Int. Cl.
*G07B 17/00* (2006.01)
(52) U.S. Cl. .......................... 705/30; 705/33
(58) Field of Classification Search ................ 705/1, 31, 705/32, 30
See application file for complete search history.

(56) References Cited

U.S. PATENT DOCUMENTS

| | | | |
|---|---|---|---|
| 5,910,988 A * | 6/1999 | Ballard ............................ | 705/75 |
| 6,064,983 A | 5/2000 | Koehler | |
| 6,078,898 A | 6/2000 | Davis et al. | |
| 6,161,098 A | 12/2000 | Wallman | |
| 6,336,124 B1 | 1/2002 | Alam et al. | |
| 6,347,304 B1 | 2/2002 | Taricani, Jr. | |
| 6,473,741 B1 * | 10/2002 | Baker ............................ | 705/31 |
| 6,567,789 B1 * | 5/2003 | Baker ............................ | 705/31 |
| 6,697,787 B1 | 2/2004 | Miller | |
| 7,050,964 B2 | 5/2006 | Menzes et al. | |
| 7,249,072 B1 * | 7/2007 | Nearhood et al. ............... | 705/31 |
| 2002/0103826 A1 | 8/2002 | Kriho et al. | |
| 2002/0111888 A1 | 8/2002 | Stanley et al. | |
| 2003/0036912 A1 | 2/2003 | Sobotta et al. | |
| 2003/0061131 A1 | 3/2003 | Parkan, Jr. | |
| 2004/0078307 A1 | 4/2004 | Carver | |
| 2004/0083145 A1 | 4/2004 | Kobayashi et al. | |
| 2004/0088233 A1 | 5/2004 | Brady et al. | |
| 2004/0103367 A1 | 5/2004 | Riss et al. | |
| 2004/0199876 A1 | 10/2004 | Ethier et al. | |
| 2004/0205008 A1 * | 10/2004 | Haynie et al. .................... | 705/31 |
| 2004/0205026 A1 * | 10/2004 | Shah et al. ...................... | 705/50 |

(Continued)

FOREIGN PATENT DOCUMENTS

KR   1020020040485   5/2002

(Continued)

OTHER PUBLICATIONS

Rev. Proc. 97-11; Anonymous; United States Internal Revenue Bulletin; Accounting & Tax Periodicals; Feb. 10, 1997, p. 13.*

(Continued)

*Primary Examiner* — M. Thein
(74) *Attorney, Agent, or Firm* — Carr & Ferrell LLP (57) ABSTRACT

Systems and methods for recreating a copy of a previously filed tax document of a user is provide. In exemplary embodiments, an order processing engine receives a user's order request for a copy of a previously filed tax document. The order request is processed with an agency, such as the IRS. A tax transcript is downloaded from the agency. Subsequently, values from the tax transcript are mapped into one or more templates to recreate the filed tax document. The recreated tax document is then delivered to the user.

19 Claims, 5 Drawing Sheets

U.S. PATENT DOCUMENTS

| | | | |
|---|---|---|---|
| 2004/0205452 A1 | 10/2004 | Fitzsimons et al. | |
| 2005/0038722 A1 | 2/2005 | Throndson et al. | |
| 2005/0131805 A1 | 6/2005 | Bross | |
| 2005/0228729 A1 | 10/2005 | Cook et al. | |
| 2005/0251733 A1* | 11/2005 | Elkady | 715/503 |
| 2006/0085304 A1 | 4/2006 | Buarque De Macedo et al. | |
| 2006/0178961 A1 | 8/2006 | Stanley et al. | |
| 2007/0033116 A1 | 2/2007 | Murray | |
| 2007/0033117 A1 | 2/2007 | Murray | |
| 2007/0033130 A1 | 2/2007 | Murray | |

FOREIGN PATENT DOCUMENTS

| | | |
|---|---|---|
| WO | WO 01/82202 | 11/2001 |
| WO | WO 2005/124579 * | 12/2005 |

OTHER PUBLICATIONS

"AppIntelligence Automates IRS Verification Process", Orgination News, Jan. 2005, vol. 14. Iss. p. 73.*

Definition of reproduce, Merriam Webster's Collegiate Dictionary, Tenth Edition, 1997.*

"PDCAT COM DLL," PDF Tools AG, last updated Jul. 31, 2006, located at http://www.pdf-tools.com/asp/products.asp?name=XTA.

Bertolucci, Jeff, •CNET Editors' Review for Intuit TurboTax Online Premier 2005, Jan. 27, 2006, located at http://reviews.cnet.com/Intuit_TurboTax_Online_Premier_2005/4505-6405_7-31672647-2.html.

* cited by examiner

SYSTEM AND METHOD FOR RECREATING TAX DOCUMENTS

CROSS REFERENCE TO RELATED APPLICATION

The present application claims the priority benefit of U.S. Provisional Patent Application No. 60/766,609 filed Jan. 31, 2006 and entitled "Method and System for Retrieving Tax Data and Recreating Income Tax Returns" which is herein incorporated by reference.

BACKGROUND OF THE INVENTION

1. Field of the Invention

Embodiments of the present invention relate generally to data processing, and more particularly to retrieving and formatting tax information in order to recreate tax documents.

2. Description of Related Art

Often time, an individual will need copies of their filed tax returns and/or income and wage statements. For example, copies of these documents are typically required by banks or other financial institutions in order to underwrite mortgage loans. Other examples of uses for the copies of the filed tax returns include landlord/tenant credit quality, SBA loan, and FAFSA student loan financial aid.

Conventionally, the individual or his/her representative submits a completed IRS form 4506(Request for Transcripts of Tax Returns) along with a processing fee via standard mail. The individual then must wait typically four to six weeks for the form to be processed by the IRS and the copies of the tax returns and/or income and wage statements to be mailed back.

In many situations, the four to six week turn-around time is too long and may prevent actions dependent on the information contained in the tax return or income and wage statements. For example, a bank may be delayed in underwriting a loan, which may result in the underwriting process extending beyond a period of time for which a particular interest rate is locked in on the proposed loan.

As an alternative, the individual may acquire a copy of their tax return or income and wage statements from their tax preparer or employer. If the tax preparer or the employer has moved, shut down, or simply stopped maintaining copies of these documents, however, the individual will not be able to obtain the required documents. Additionally, information or documents received by the individual may have been altered or include data not consistent with actual data (e.g., actual tax return data that the IRS has).

Therefore, there is a need for systems and methods for accessing and retrieving tax data. There is a further need to accurately recreate tax documents utilizing the retrieved tax data.

SUMMARY OF THE INVENTION

Embodiments of the present invention provide systems and methods for recreating a copy of a previously filed tax document of a user. In exemplary embodiments, an order processing engine receives a user's order request for a copy of a previously filed tax document. The user will enter the order request along with client information, such as social security number, adjusted name, and address, via an information collection point. The user may also be required to revise incorrect information via the same information collection point.

Once the user has completed the order request and corrected any errors, the order request is processed with an agency, such as the IRS. In exemplary embodiments, a tax service provider takes the client information and via electronic means accesses and requests tax information from the agency. Access may require the tax service provider to provide login and password information and submit representative and power information. The requests for tax information may comprise submitting one or more forms, such as Form 2848. Once submitted, the status of the order request is marked as submitted.

After a period of time has passed, the tax service provider will access the agency website to check submitted order requests. If a tax transcript is available for download for one or more submitted order requests, each tax transcript is downloaded. The tax transcript will appear as a file of unformatted values which has a consistent arrangement of data.

Subsequently, values from the tax transcript are mapped or parsed into one or more templates to recreate the filed tax document. In some embodiments, values may be utilized to calculate other values to be mapped into the template.

The mapped template (i.e., recreated tax document) may be further processed for delivery to the user. For example, the recreated tax document may be converted into a .pdf file, and/or a plurality of recreated tax documents for a single user may be merged into fewer or a single file. In some embodiments, the file(s) is attached to an e-mail message to be sent to the user.

DETAILED DESCRIPTION OF EXEMPLARY EMBODIMENTS

Figure 1:
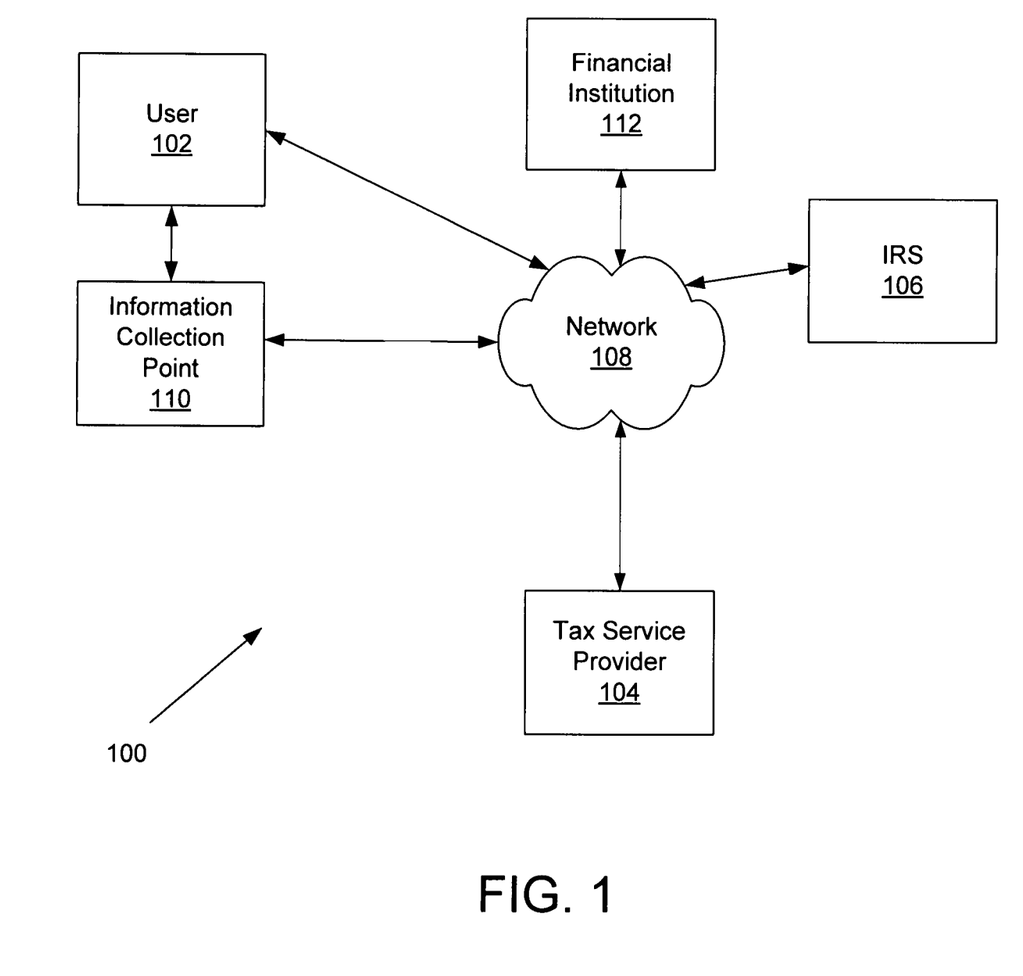
FIG. 1 is an environment in which embodiments of the present invention may be practiced.

FIG. 1 is an exemplary environment 100 in which embodiments of the present invention may be practiced. The exemplary environment 100 comprises at least one user 102 and a tax service provider 104 coupled in communication to the Internal Revenue Service (IRS) 106 via a network 108. In one embodiment, the network 108 is the Internet. In a further embodiment, the network 108 may comprise a combination of the Internet, postal service, and/or phone/fax services.

The user 102 is an individual requiring previously filed tax information or documents from the IRS 106. To obtain the filed tax information, the user 102 sends an order request and provides client information, identifying the user 102, to an information collection point 110. In exemplary embodiments, the information collection point 110 is a website configured to collect user (client) information that is required to complete requests for the tax information (i.e., tax transcripts) from the IRS 106. The website may, in some embodiments, embody one or more forms which provide fields for the user 102 to enter the required client information. The required client information may comprise social security number, last name, address, birthday, adjusted gross income (AGI) amount, AGI year. The order request will also include information regarding forms/data requested and the year(s) of the requested form/data. The forms/data requested may comprise, for example, forms 1040, 1040A, 1040EZ, W2, W2G, and 1099, of which the user 102 desires copies.

In some embodiments, the client information is forwarded to the tax service provider 104 as an order request for filed tax documents. In alternative embodiments, the information collection point 110 is embodied within the tax service provider 104 website. For example, the information collection point 110 may comprise one or more web pages of the tax service provider 104 on which the user 102 enters their client information. In these embodiments, the client information is automatically received by the tax service provider 104 and utilized to request the filed tax information from the IRS 106.

In alternative embodiments, the information collection point 110 may comprise a plurality of components in combination to obtain the client information. For example, the information collection point 110 may include in-person, phone, mail, and/or fax collection of client information.

The tax service provider 104 is an entity which retrieves the tax information and recreates requested tax documents for the user 102. For example, the tax service provider 104 may be a tax preparation company, an accountant, or any other entity having legal authority to represent the user 102 with the IRS 106. The tax service provider 104 will be discussed in more details in connection with FIG. 2 and FIG. 3 below.

The IRS 106 receives a request for tax data from the tax service provider 104. In some embodiments, a special relationship exists between the tax service provider 104 and the IRS 106 which allows the tax service provider 104 to request, electronically, the tax data. Upon receiving the request from the tax service provider 104, the IRS 106 processes the request and provides access to the requested tax data from the IRS data archive. In an alternative embodiment, the IRS 106 may electronically forward the requested tax data to the tax service provider 104.

In exemplary embodiments, the tax data received from the IRS 106 is a tax transcript comprising raw tax data. The raw tax data in the tax transcript is typically incomprehensible to the user 102 (e.g., a series of raw numbers and values). Therefore, the tax service provider 104 reformats the raw tax data into a format that will be comprehensible to the user 102. In exemplary embodiments, the raw tax data is mapped/parsed into tax form templates that recreate various filed tax documents (e.g., forms 1040, 1040A, 1040EZ, W2, W2G, and 1099). Alternative embodiments may utilize other forms or documents which may be customized with the user's raw tax data. Once parsed, the recreated tax documents are forwarded to the user 102 (e.g., via e-mail, regular mail, etc.). In some embodiments, the recreated tax document may be converted into a .pdf document before being e-mailed to the user 102.

In some embodiments, the requested copies of tax documents are required by a financial institution 112 associated with the user 102. For example, the financial institution 112 is a bank underwriting a mortgage for the user 102. In these embodiments, the recreated tax documents may be forwarded by the tax service provider 104 directly to the financial institution 112.

While FIG. 1 shows access to the IRS 106, alternative embodiments may access other agencies for filed documents. For example, a state franchise tax board may be accessed by the tax service provider 104 to obtained previously filed state tax data.

Figure 2:
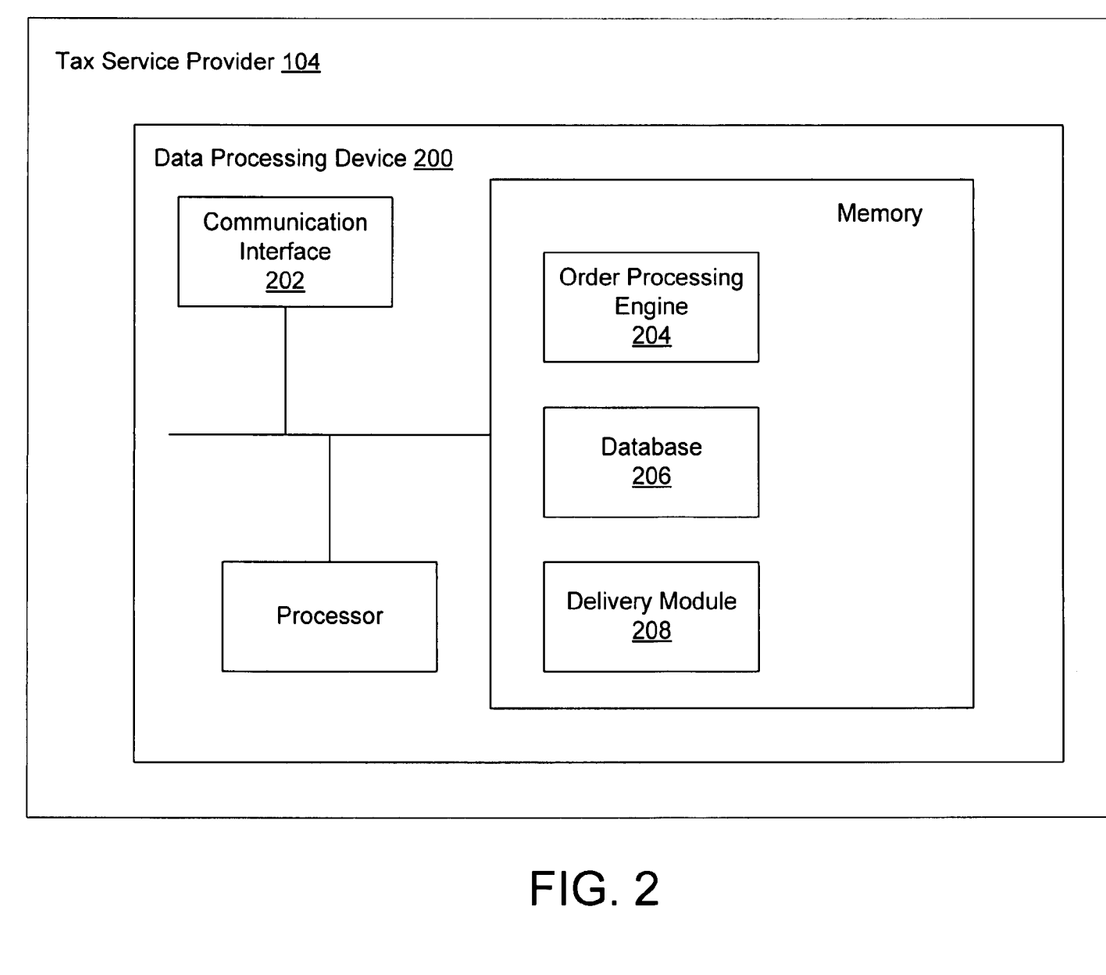
FIG. 2 is a block diagram of an exemplary tax service provider according to one embodiment of the present invention.

Referring now to FIG. 2, the tax service provider 104 is shown in more detail. In exemplary embodiments, the tax service provider 104 comprises one or more data processing devices 200. In one embodiment, the data processing devices 200 are computers or laptops. In further embodiments, the data processing device 200 may comprise a combination of a computing device and a human user or operator.

Each data processing device 200 may comprise a communication interface 202, an order processing engine 204, a database 206, and a delivery module 208. The data processing device 200 may comprise other elements not related to the retrieval and formatting of filed tax data. For example, if the tax service provider 104 is a tax preparation company, the data processing device 200 will comprise tax preparation components. In some embodiments, the data processing device 200 may further comprise, or be coupled to, the information collection point 104 as discussed in FIG. 1.

The communication interface 202 allows the data processing device 200 to communicate with both the user 102 (FIG. 1) and the IRS 106 (FIG. 1). In some embodiments, the communication interface 202 is a mechanism which allows electronic communication with the user 102 and/or the IRS 106. Alternatively, or in addition, the communication interface 202 may be an interface to a POTS (plain old telephone service) line for phone calls and faxes. Other forms of communication interfaces 202 may be utilized.

In exemplary embodiments, the order processing engine 204 performs the request, retrieval, and formatting functions of the system. The order processing engine 204 will be discussed in more details in connection with FIG. 3 below.

One or more databases 206 may be provided to store data, such as the retrieved tax transcripts or template forms which may be populated with data from the retrieved tax transcripts. While the database 206 is shown being embodied within the data processing device 200, alternatively, the database 206 may be located outside of the data processing device 200 (e.g., on a general server of the tax service provider 106 or at a host storage facility), but be coupled thereto the data processing device 200.

The delivery module 208 prepares the recreated tax documents for delivery to the requesting user 102. In one embodiment, the delivery module 208 creates an e-mail message and attaches the recreated tax documents to the e-mail message. The e-mail message is then placed in an outbox for delivery to the user 102. In alternative embodiments, the delivery module 208 may prepare the recreated tax documents for faxing or mail delivery to the user 102. In yet further embodiments, the delivery module 208 may prepare the recreated tax document for download via the network 108 (e.g., the Internet).

Figure 3:
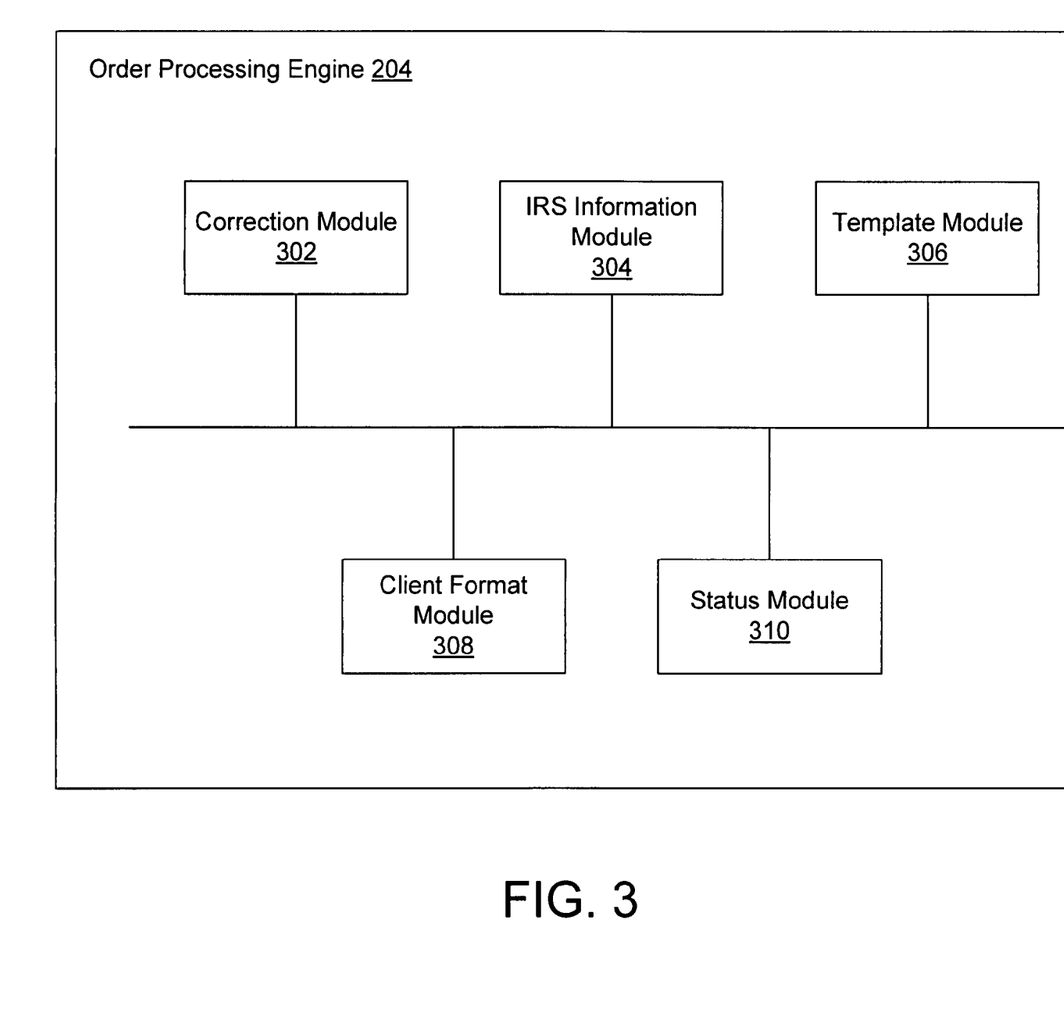
FIG. 3 is a block diagram of an exemplary order processing engine.

Referring now to FIG. 3, the order processing engine 204 is shown in more detail, according to one embodiment of the present invention. The exemplary order processing engine 204 comprises a correction module 302, an IRS information module 304, a template module 306, a client format module 308, and a status module 310. More, less, or other functionally equivalent modules may be provided in alternative embodiments of the order processing engine 204. For example, one or more of the modules 302-310 may be optional.

In one embodiment, the correction module 302 examines the client information received from the user 102 (FIG. 1) and determines if the client information is accurate and complete. Thus, the correction module 302 will determine if all client information (i.e., fields) required by the IRS 106 (FIG. 1) has been provided by the user 102. Further, the correction module 302 may check for errors in the client information (e.g., too many digits entered for the social security or birthday fields). In further embodiments, the correction module 302 may notify a user 102 if the IRS 106 detects one or more errors, and request that the user 102 provide the corrected information.

It should be noted that the information collection point 104 may also comprise or be coupled to the correction module 302. Thus, for example, concurrent with the user 102 providing their client information, the correction module 302 may review the client information to insure accuracy and completeness. The user 102 may then revise or correct any inaccurate information.

In some embodiments, the IRS information module 304 prepares the client information for submission to the IRS 106. For example, the IRS information module 304 formats the client information into a format required to populate forms of the IRS 106. The client information may then be provided to the IRS 106 via the communication interface 202 (FIG. 2).

In some embodiments, the IRS information module 304 also receives or obtains the user's raw tax data. In exemplary embodiments, the raw tax data is provided in a tax transcript. The tax transcript is a text document unformatted except for a consistent arrangement of data. The tax transcript may be copied into a clipboard, be temporarily stored in the database 206, or temporarily stored in another location.

Once the tax transcript is obtained from the IRS 106, the raw tax data in the tax transcript is formatted via the template module 306. In one embodiment, the template module 306 accesses tax templates (e.g., from the database 206) and populates fields in one or more tax templates with the proper tax data by parsing the raw tax data into the tax templates. Parsing the raw tax data allows for fields to be separated into their appropriate categories at which point calculations may be performed to determine values of certain required fields which may be omitted in the data transcript.

In exemplary embodiments the tax templates are identical in appearance to tax documents which are filed with the IRS 106 (e.g., forms 1040, 1040A, 1040EZ, W2, W2G, and 1099). As a result, the populated tax template will appear as a copy of a previously filed tax document. In other words, the populated tax template can be considered as a recreation of a previously filed tax document, wherein the recreation is visually identical to the tax document as originally filed.

Once the tax templates are populated with the raw tax data, the recreated tax documents may be converted into a format that is convenient for the user 102. The client format module 308 may, for example, convert the recreated tax document into a .pdf or other format for e-mailing to the user 102. Alternatively, the client format module 308 may format the recreated tax document into a faxable document or a document which can be mailed. The client format module 308 may also merge a plurality of recreated tax documents into fewer or a single file for delivery to the user 102. In an embodiment where the recreated tax document are already in a form that may be sent to the user 102 (e.g., the templates are .pdf documents), the client format module 308 may not be required.

Once properly formatted and/or merged, the recreated tax document(s) may now be forwarded to the user 102. In exemplary embodiments, the recreated tax document(s) may be sent individually or grouped together for one user 102. Delivery on an individual basis, however, will ensure that a group of recreated tax documents will not be delayed while waiting for completion of one document in the group.

The status module 310 maintains and monitors status of a user's order to insure that the order request is timely processed. When certain conditions are met, the status module 310 may also trigger responses. The functionality of the status module 310 will be discussed in more detail in connection with FIG. 4 and FIG. 5 below. The status of the order request may be stored in the database 206 (FIG. 2) and updated accordingly.

Figure 4:
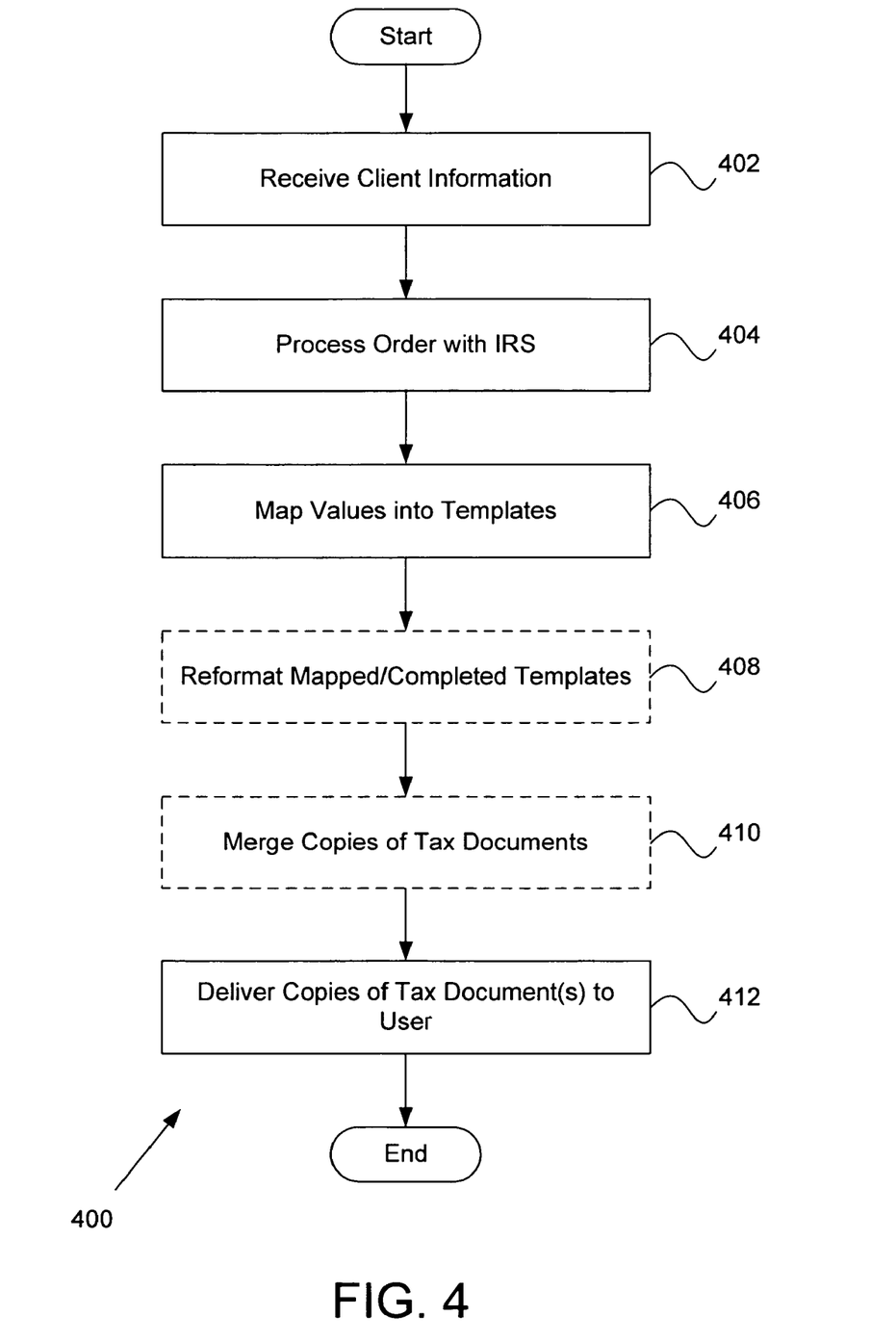
FIG. 4 is a flowchart of an exemplary method for obtaining tax information and recreating tax documents based on the obtained tax information.

Referring now to FIG. 4, a flowchart 400 of an exemplary method for obtaining tax information and recreating tax documents based on the retrieved tax transcripts is shown. In step 402, the order request including client information from the user 102 (FIG. 1) is received by the data processing device 200 (FIG. 2). In exemplary embodiments, the client information is initially received at the information collection point 110 (FIG. 1). The information collection point 110 may be a website devoted to collecting information identifying the user 102 (e.g., social security number, name, address) and the tax documents required by the user 102. Additional information such as AGI, AGI year, birth date may be also be collected and utilized to validate the user's identity.

The information collection point 110 may also obtain consent from the user 102 to allow the tax service provider 104 (FIG. 1) to request the tax transcripts from the IRS 106 (FIG. 1) on the user's behalf. In exemplary embodiments, this consent is given electronically.

In embodiments where the tax service provider 104 comprises a plurality of data processing devices 200, a particular data processing device 200 may be assigned to the new order request such that the assigned data processing device 200 will be the primary device through which the requested tax data will be processed. In some embodiments, the assignment may occur by associating a name or identifier for the assigned data processing device 200 with the new order request. While the assigned data processing device 200 is the primary device, and in some embodiments the only device, to process the order request, other data processing devices 200 may provide back-up support (e.g., when the assigned data processing device 200 is not available). The assignment of the data processing device 200 to an order request may be stored as a status (e.g., status is "new order assigned") in the database 206 (FIG. 2) by the status module 310 (FIG. 3).

In step 404, the order request is processed with the IRS 106. In some embodiments, step 404 is triggered when the status module 310 detects a "new order assigned" status. Accordingly, the assigned data processing device 200 loads the specific order information and connects to the IRS 106 for processing. The processing of the order request by the IRS 106 in step 404 will be discussed in detail in connection with FIG. 5 below. Once processed, the requested tax data is obtained from the IRS 106, and the status of the order request is updated by the status module 310 to reflect that the tax transcript is downloaded.

Next in step 406, the values/data in the downloaded tax transcripts are mapped into templates. In one embodiment, the status module 310 monitors the statuses of the order requests. When an order request is detected with a status of "transcript download," the order processing engine 204 (e.g., the IRS information module 304) opens the associated tax transcript and reads the tax transcripts. Working with the template module 306 (FIG. 3), the values in the tax transcripts are mapped or parsed into fields of one or more templates. Some of the fields may require computation on the retrieved tax data.

In exemplary embodiments, the mapped templates are .pdf documents of recreated tax forms/documents (e.g., Form 1040, Schedules A-F, and EIC). In other embodiments, the mapped templates are recreated tax forms/documents in other formats (i.e., non-.pdf format). In these cases, the recreated tax document are converted in optional step 408 into .pdf tax documents by the client format module 308 (FIG. 3). After the .pdf tax documents are generated, the status of the order request is updated (e.g., status is ".pdf created") by the status module 310.

The processes of step 406 and optional step 408 may be repeated if more than one order request indicates a downloaded status. That is, the order processing engine 204 may, at predetermined times, check the statuses of a plurality of order requests. When a plurality of order requests indicates a downloaded status, the requested (copies of) tax documents are generated for the plurality of order requests (i.e., in series). In one embodiment, the plurality of order requests is from one user 102.

In optional step 410, recreated tax documents may be merged for a single user 102. Merging of recreated tax documents may be accomplished using a file naming convention, which makes it easy to isolate related recreated tax document files (e.g., for the same user 102). For example, recreated tax documents that are determined to come from the same tax transcript are merged into a single common filename by the client format module 308. In one embodiment, the plurality of related, recreated tax document files are each opened individually and copied into a new (single) tax document file. Subsequently, the status of the order request may reflect that the order request has been merged (e.g., status is ".pdf merged"). In alternative embodiments, the related, recreated tax documents may not be merged, but are delivered to the user 102 separately.

In step 412, the recreted tax documents are delivered to the user 102 or the financial institution 112 (FIG. 1). In one embodiment, the status module 310 may periodically monitor the status for ".pdf created" or ".pdf merged" status. Once tax documents having these statuses are detected, the delivery module 208 (FIG. 2) will compile information associated with the order request (e.g., name, e-mail, filename, path to database), and create an e-mail using a predefined e-mail template (e.g., stored in the database 206). The delivery module 208 may also attach the recreated tax documents to the e-mail. In one embodiment, the delivery module 208 will then store the completed e-mail in a database table (e.g., out box). The e-mail is then sent via the communication interface 202 (FIG. 2). If the e-mail is sent successfully, the status of the order request is updated to indicate a "sent" status by the status module 310. If, however, the e-mail is not successfully sent, the status is changed to "rejected." In this situation, the delivery module 208 may try to send the e-mail again or use a different delivery mechanism (e.g., fax or mail).

It should be noted that embodiments of the present invention are designed to process each merged, recreated tax document separately, so as not to allow an error with any particular delivery to affect other recreated tax documents. This means that a single order request may create a plurality of merged, recreated tax documents, each to be sent individually to the user 102.

Figure 5:
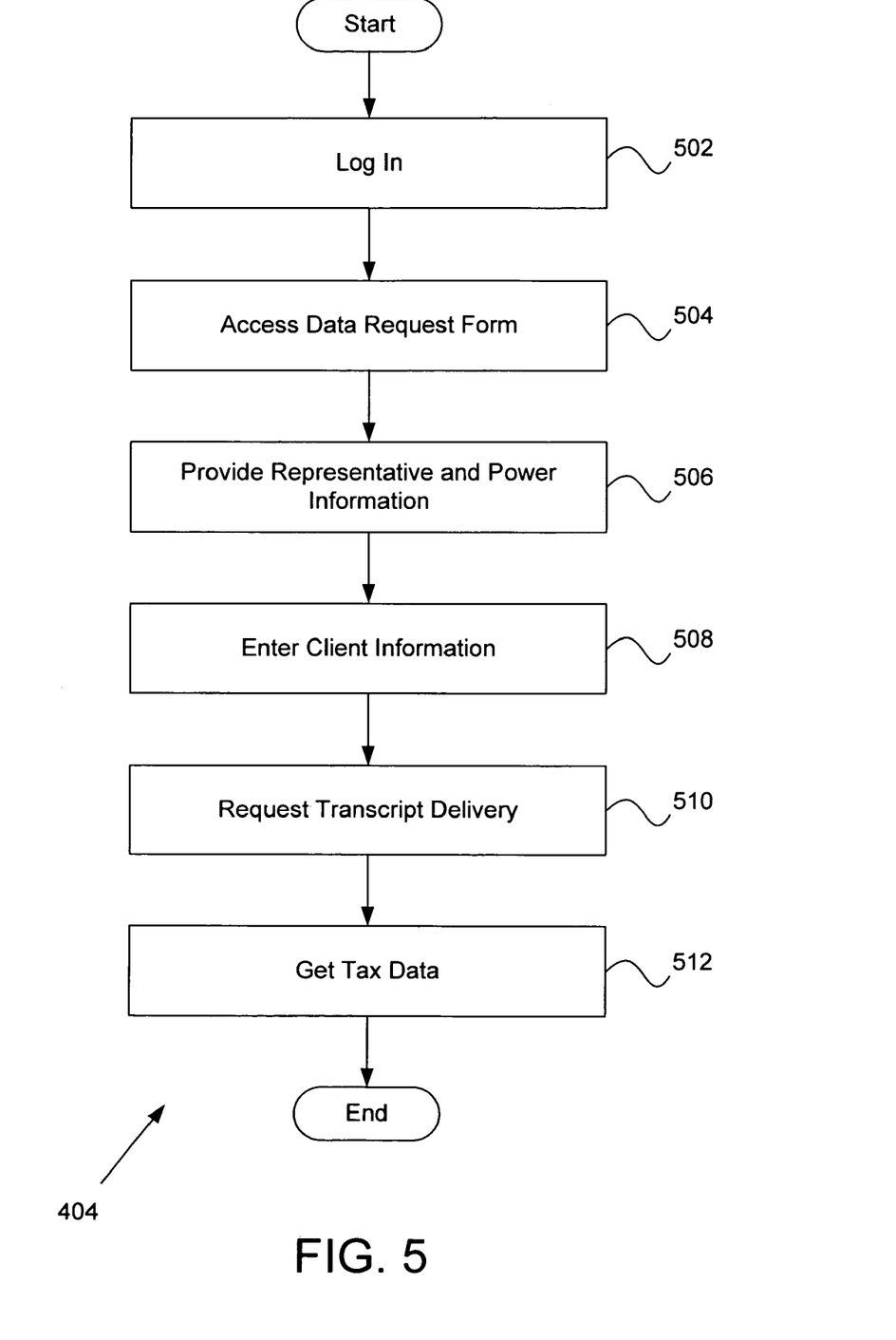
FIG. 5 is a flowchart of an exemplary method for processing an order with the IRS.

Referring now to FIG. 5, a flowchart 500 of an exemplary method for processing an order request with the IRS 106 (FIG. 1), step 404, is shown in more detail. In step 502, tax service provider 104 (FIG. 1) logs in with the IRS 106. Thus, a data processing device 200 (FIG. 2) accesses the IRS 106 website and provides information identifying the tax service provider 104.

Next, a data request form is accessed in step 504. In exemplary embodiments, the data request form is Form 2848. of the IRS 106. Accordingly, a disclosure authorization link is selected, and from the ensuing web pages, a link to the New Form 2848. for Individuals is selected. A disclosure agreement is submitted and accepted by the IRS 106, and Form 2848. is accessed. This form is then populated using user identity information (e.g., social security number, name, address) obtained via the information collection point 104.

After submitting the data request form, representative and power information is provided in step 506. The representative information may comprise centralized authorization file (CAF) number, name, country, phone number, address, designation and jurisdiction state) for example. Once the representative information is submitted, power information is provided. In one embodiment, the "Send a copy of the notice to the first representative" field is selected. Subsequently, a representative signature web page is presented. This web page will require that the representative (i.e., tax service provider 104) provide a password and personal identification number. The "signature" is then validated by the IRS 106.

In some embodiments, a taxpayer signature page is then provided by the IRS 106. Client information is entered in step 508. Information such as adjusted gross income, adjusted gross income year, date of birth, and (user 102) personal identification number, as obtained via the information collection point 110, may be provided to the IRS 106.

Upon selecting a validate signature button on the page, a review and submit page is presented. Assuming the taxpayer signature is properly validated, the order request is now submitted. The status of the order request may be update to reflect a "submitted" status by the status module 310. In some embodiments, the connection with the IRS 106 is disconnected (e.g., the IRS 106 window is closed).

It should be noted that embodiments of the present invention can obtain requested tax transcripts in a matter of seconds or minutes, or hours in cases of network errors or client errors, as opposed to prior art systems which require a four to six week wait for copies of tax documents. Therefore, at a particular time, the order processing engine 204 will access the IRS 106 site to check on the status of one or more submitted order requests. In some embodiments, the particular time may be predetermined by the tax service provider 104. For example, the order processing engine 204 may check at the end of every business day or four hours after an order request is updated to a submitted status.

In step 510, a delivery request is made for the tax transcript. In exemplary embodiments, when the status module 310 of an assigned data processing device 200 detects a submitted order (i.e., status is "submitted"), the assigned data processing device 200 requests the tax transcript delivery at an appropriate (e.g., predetermined) time. In an embodiment where the data processing device 200 is not already logged in and in communication with the IRS 106 website, the data processing device 200 will load the submitted order request data and log into the IRS website (i.e., provide tax service provider 104 login information).

Once logged in, an on-line transcript request selection is made on the website. In some embodiments, this request selection will submit the required user 102 information (e.g., social security number and name) and requested information (e.g., form number, tax period earn tax period month, etc.) to identify the submitted order request. The status of the order request is then update to reflect a "forms requested" status by the status module 310.

In exemplary embodiments, a plurality of order requests may be processed at the same time (via serial processing). That is, if more than one order request has a submitted status, these order requests may have tax transcript delivery requests submitted in series. In some embodiments, the order processing engine 204 counts a number of repetitions (e.g., X times) performed of the transcript request step in order to determine a number of transcripts to download in step 512.

The tax transcript is then downloaded in step 512. In one embodiment, a Get Product webpage is accessed on the IRS 106 site. A Get Product link is selected to open the first tax transcript. Content of the first transcript is then selected in its entirety and saved to a predetermined directory or database 206. The status of the associated order request is then updated to reflect a "transcript downloaded" status. In embodiments where the order processing engine 204 is processing a plurality of downloads in series, the transcript download step is repeated (e.g., X times) so that each requested transcript is downloaded. The connection with the IRS 106 may then be disconnected.

Depending on the IRS 106 website, the steps of FIG. 5 may be performed in a different order. For example, steps 504, 506, and 508 may be practiced in a different order. In further embodiments, some of the steps of FIG. 5 are optional or not needed. For example, steps 504, 506, and 507 may comprise a single step of submitting information on a single form.

It should be noted that while embodiments of the present invention have been described as retrieving data from the IRS 106, the present system may also be used to retrieve data from state tax departments, the social security administration, and other government agencies. Also, embodiments of the present invention not only recreate actual tax returns, but can also recreate official income forms (e.g., W2. and 1099) and other official forms from various government agencies by populating stored templates of these official forms with retrieved filed data.

In exemplary embodiments, the order processing engine 204 is an automated system which allows for increased productivity and decreased cost of operations. While a computing device provides the greatest benefits as an order processing engine 204, a human operator could alternatively, or in combination with a computing device, fulfill the role of some of the components of the order processing engine 204. For example, some of the steps of FIG. 5 may be automated while others are performed by a human operator. In further embodiments, a plurality of order processing engines 200 may be operating on a plurality of data processing devices 206 simultaneously to accommodate swift changes in order request volume.

The above-described functions and components can be comprised of instructions that are stored on a storage medium. The instructions can be retrieved and executed by a processor. Some examples of instructions are software, program code, and firmware. Some examples of storage medium are memory devices, tape, disks, integrated circuits, and servers. The instructions are operational when executed by the processor to direct the processor to operate in accord with embodiments of the present invention. Those skilled in the art are familiar with instructions, processor(s), and storage medium.

The present invention has been described above with reference to exemplary embodiments. It will be apparent to those skilled in the art that various modifications may be made and other embodiments can be used without departing from the broader scope of the invention. For example, embodiments of the present invention may be used to obtain data transcripts from other agencies (e.g., financial institutions, schools, businesses, etc.) and recreate different types of documents. Therefore, these and other variations upon the exemplary embodiments are intended to be covered by the present invention.

What is claimed is:

1. A system for producing a recreation of a tax document that was previously filed by a user, the system comprising:
   an order processing engine stored in memory and executable by a processor to process an order request for the recreation of the previously filed tax document, to obtain tax information comprising raw data from a government agency with which the tax document had been previously filed, and to parse the raw data from the tax information into a tax document template to generate the recreation of the previously filed tax document, wherein the recreation of the previously filed tax document is visually identical to the tax document as originally filed, including the processor to mathematically calculate one or more quantitative values for the tax document template using the raw data from the tax information, wherein parsing the raw tax data separates the fields into categories at which calculations are performed to determined values of certain required fields.

2. The system of claim 1, further comprising an information collection point configured to obtain client information to create the order request, the client information being utilized by the order processing engine to obtain the tax information.

3. The system of claim 1, wherein the order processing engine comprises a template module executable by a processor to parse the raw data from the tax information into the tax document template.

4. The system of claim 1, wherein the order processing engine comprises a client format module executable by a processor to format the recreated tax document into a proper format for the client.

5. The system of claim 1, wherein the order processing engine comprises a status module executable by a processor to track a status of the order request.

6. The system of claim 1, wherein the order processing engine comprises an Internal Revenue Service (IRS) information module executable by a processor to provide the client information to the Internal Revenue Service.

7. The system of claim 1, wherein the order processing engine comprises a correction module executable by a processor to verify whether a client information is accurate and to request that the user correct errors in the client information when the client information is not accurate.

8. The system of claim 1, further comprising a delivery module stored in memory and executable by a processor to deliver the recreated tax document to the user or a financial institution.

9. The system of claim 1, wherein the order processing engine comprises an Internal Revenue Service (IRS) information module executable by a processor to download the tax information from the Internal Revenue Service.

10. A method for producing a recreation of a tax document that was previously filed by a user, the method comprising:
    executing instructions stored in memory using a processor to process an order request for the recreation of the previously filed tax document, the order request from the user;
    executing instructions stored in memory using a processor to download tax information comprising raw data from a government agency with which the tax document had been previously filed; and
    executing instructions stored in memory using a processor to parse the raw data from the tax information into a tax document template to generate the recreation of the previously filed tax document, wherein the recreation of the previously filed tax document is visually identical to the tax document as originally filed, including the processor mathematically calculating one or more quantitative values for the tax document template using the raw data from the tax information, wherein parsing the raw tax data separates the fields into categories at which calculations are performed to determined values of certain required fields.

11. The method of claim 10, further comprising executing instructions stored in memory using a processor to receive client information associated with the order request.

12. The method of claim 10, further comprising executing instructions stored in memory using a processor to convert the recreated tax document into a portable document format.

13. The method of claim 10, further comprising executing instructions stored in memory using a processor to merge a plurality of recreated tax document into few files for a single user.

14. The method of claim 10, further comprising executing instructions stored in memory using a processor to deliver the recreated tax document to the user.

15. The method of claim 10, further comprising executing instructions stored in memory using a processor to update status of the order request when an action is completed for the order request.

16. The method of claim 10, wherein the government agency is the Internal Revenue Service.

17. The method of claim 10, wherein the government agency is a state franchise tax board.

18. The method of claim 10, wherein the tax information is downloaded and the raw data is mapped repeatedly in series for a plurality of order requests.

19. A machine readable storage medium having embodied thereon a program, the program executable by a processor to perform a method for providing a recreation of a tax document that was previously filed by a user, the method comprising processing an order request for the recreation of the previously filed tax document, the order request received from the user;

parsing the raw data from the tax information into a tax document template to generate the recreation of the previously filed tax document, wherein the recreation of the previously filed tax document is visually identical to the tax document as originally filed, including the processor mathematically calculating one or more quantitative values for the tax document template using the raw data from the tax information, wherein parsing the raw tax data separates the fields into categories at which calculations are performed to determined values of certain required fields.

\* \* \* \* \*